US011822525B2

(12) United States Patent
Bhowmick et al.

(10) Patent No.: US 11,822,525 B2
(45) Date of Patent: Nov. 21, 2023

(54) ENTERPRISE APPLICATIONS DRIVEN BY COMMON METADATA REPOSITORY

(71) Applicant: ADOBE INC., San Jose, CA (US)

(72) Inventors: Prantik Bhowmick, Bengaluru (IN); Piyush Gupta, Bangalore (IN); Vinayak Fakira Jadhav, Castro Valley, CA (US); Wissam Zeidan, Duvall, WA (US); Narasimha Bharadwaj, Bangalore (IN); Vasanthi Holtcamp, Fremont, CA (US)

(73) Assignee: ADOBE, INC., San Jose, CA (US)

( * ) Notice: Subject to any disclaimer, the term of this patent is extended or adjusted under 35 U.S.C. 154(b) by 2 days.

(21) Appl. No.: 17/653,792

(22) Filed: Mar. 7, 2022

(65) Prior Publication Data

US 2023/0281171 A1 Sep. 7, 2023

(51) Int. Cl.
*G06F 16/21* (2019.01)
*G06F 16/25* (2019.01)
*G06F 16/248* (2019.01)
(52) U.S. Cl.
CPC .......... *G06F 16/212* (2019.01); *G06F 16/248* (2019.01); *G06F 16/258* (2019.01)
(58) Field of Classification Search
None
See application file for complete search history.

(56) References Cited

U.S. PATENT DOCUMENTS

| 9,075,788 | B1* | 7/2015 | Roth | G06F 11/3086 |
| 9,210,178 | B1* | 12/2015 | Roth | H04L 63/105 |
| 9,565,260 | B2* | 2/2017 | Roth | G06F 11/3086 |
| 10,469,330 | B1* | 11/2019 | Roth | H04L 41/22 |
| 10,764,204 | B2* | 9/2020 | Ionita | G06F 9/5005 |
| 2014/0372367 | A1* | 12/2014 | McLean | H04L 63/083 |
| | | | | 707/603 |
| 2015/0312356 | A1* | 10/2015 | Roth | G06F 11/3086 |
| | | | | 709/226 |
| 2018/0375788 | A1* | 12/2018 | Ionita | G06F 9/5077 |
| 2020/0067791 | A1* | 2/2020 | Roth | H04L 41/40 |

\* cited by examiner

*Primary Examiner* — Kim T Nguyen
(74) *Attorney, Agent, or Firm* — F. CHAU & ASSOCIATES, LLC

(57) ABSTRACT

Systems and methods for enterprise applications supported by common metadata repository are described. One or more aspects of the systems and methods include storing a plurality of entity schemas in a metadata repository, wherein each of the plurality of entity schemas corresponds to a different entity service from a plurality of entity services that interact with an application; storing a plurality of extension schemas in the metadata repository, wherein each of the plurality of extension schemas corresponds to a different extension service from a plurality of extension services utilized by the application; receiving, at the metadata repository from an extension service of the plurality of extension services, an entity schema request indicating an entity schema corresponding to an entity service of the plurality of entity services; and providing, from the metadata repository to the extension service, the entity schema in response to the entity schema request.

16 Claims, 7 Drawing Sheets

ENTERPRISE APPLICATIONS DRIVEN BY COMMON METADATA REPOSITORY

BACKGROUND

The following relates generally to data management, and more specifically to enterprise applications supported by common metadata repository.

Data management may generally relate to any aspects for managing data as a valuable resource. For instance, data management may include gathering of data (e.g., through experiments, published data, data transfers, etc.), analysis of gathered data, visualization of data analysis, sharing of data, archiving data, destroying data, etc.

Data analysis, or analytics, is the process of inspecting, cleaning, transforming and modeling data. In some cases, data analytics systems may include components for discovering useful information, collecting information, informing conclusions and supporting decision-making. Data analysis can be used to make decisions in a business, government, science or personal context. Data analysis includes a number of subfields including data mining and business intelligence. Data mining refers to techniques that focuses on statistical modeling and knowledge discovery for predictive purposes (i.e., as opposed to purely descriptive purposes). Business intelligence refers to data analysis that relies heavily on data aggregation to support business decisions. In a statistical context, data analysis includes descriptive statistics, exploratory data analysis (EDA), and confirmatory data analysis (CDA).

Enterprise applications may be composed of large number of 'entities' belonging to that domain. For example, a customer relationship management (CRM) application may be composed of entities such as contacts, leads, opportunities, customers, cases, etc. As another example, a data processing platform may be composed of entities such as schemas, datasets, sources, destinations, etc. In some cases (e.g., in the new world of microservices), getting a view of relationships and hierarchies between different entities may be difficult, managing various sources of truth metadata repositories may be difficult, etc. Accordingly, there is a need in the art for improved data management techniques.

SUMMARY

A method, apparatus, non-transitory computer readable medium, and system for enterprise applications supported by common metadata repository are described. One or more aspects of the method, apparatus, non-transitory computer readable medium, and system include storing, by an entity database of a metadata repository, a plurality of entity schemas, wherein each of the plurality of entity schemas corresponds to a different entity service from a plurality of entity services that interact with an application; storing, by an extension database of the metadata repository, a plurality of extension schemas, wherein each of the plurality of extension schemas corresponds to a different extension service from a plurality of extension services utilized by the application; receiving, by a request component of the metadata repository from an extension service of the plurality of extension services, an entity schema request indicating an entity schema corresponding to an entity service of the plurality of entity services; and providing, by the request component of the metadata repository to the extension service, the entity schema in response to the entity schema request.

A method, apparatus, non-transitory computer readable medium, and system for enterprise applications supported by common metadata repository are described. One or more aspects of the method, apparatus, non-transitory computer readable medium, and system include instructions to store, by an entity database of a metadata repository, a plurality of entity schemas, wherein each of the plurality of entity schemas corresponds to a different entity service from a plurality of entity services that interact with an application; store, by an extension database of the metadata repository, a plurality of extension schemas, wherein each of the plurality of extension schemas corresponds to a different extension service from a plurality of extension services utilized by the application; receive, by a request component of the metadata repository from an entity service of the plurality of entity services, an extension schema request indicating an extension schema corresponding to an extension service of the plurality of extension services; and provide, from the request component of the metadata repository to the entity service, the extension schema in response to the extension schema request.

A system for data management is described. The system includes a plurality of entity services configured to store data related to one or more entities used by an application; a plurality of extension services configured to provide extended functionality for the application; and a metadata repository configured to store entity schemas of the plurality of entity services and extension schemas of the plurality of extension services, and to provide the entity schemas or the extension schemas upon request, wherein the metadata repository includes a single source-of-truth repository across the plurality of entity services and the plurality of extension services.

DETAILED DESCRIPTION

Figure 1:
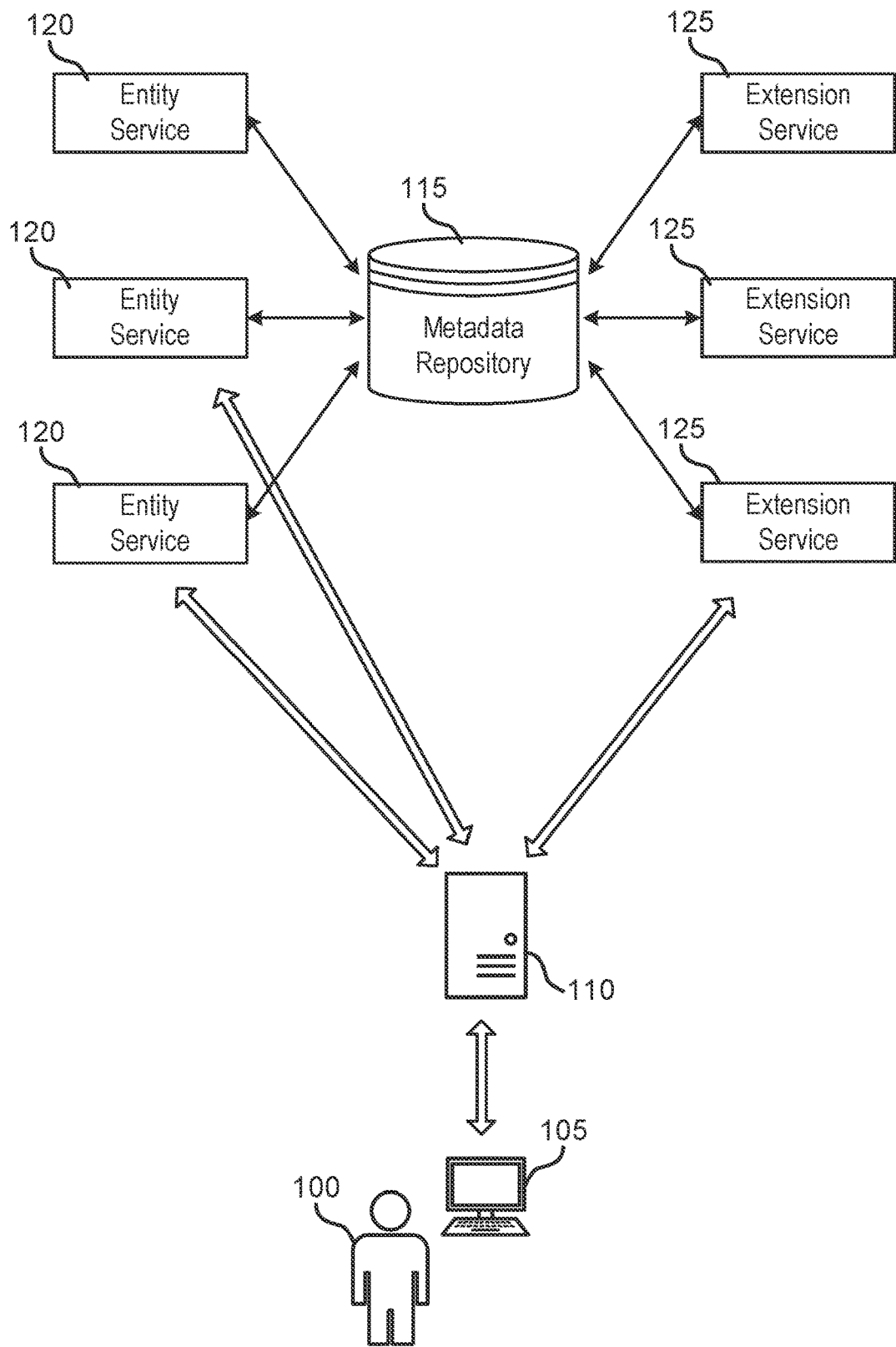
FIG. 1 shows an example data management system according to aspects of the present disclosure.

Enterprise applications may be composed of large number of entities belonging to that domain. For example, a customer relationship management (CRM) application may be composed of entities such as contacts, leads, opportunities, customers, cases, etc. As another example, a data processing platform may be composed of entities such as schemas, datasets, sources, destinations, etc.

Traditionally, these applications may be built with a unitary software structure, where each entity is a 'class' in an object oriented programming model, and each entity's relationships and hierarchy are modeled carefully using well known design patterns. Additionally, some enterprise application systems may be based on entity onboarding on to a microservice/capability individually, such that each microservice has its own source-of-truth metadata repository. In the more recent microservices model, getting a view of relationships and hierarchies between different entities may be difficult, as each microservice code may be separated in its own repository, and interactions happen using a representational state transfer (REST) application programming interface (API) instead of direct library dependencies and function calls. Moreover, such systems may require separate teams that own/manage various separate source-of-truth metadata repositories for respective entities definitions and microservices specifications.

With schemas for different services stored in different places, when a new entity is created, it is not interoperable with the different services. Similarly, if a new extension service is created without a common metadata repository, it may not be compatible with all of the existing entities and other services.

Systems and techniques of the present disclosure describe a scalable common metadata repository model including a single-source-of-truth repository across all entities and extension services. By collecting schemas from entity services and extension services at the same location (e.g., at the metadata repository), both types of services may be created, updated, and operated more efficiently. The entity schemas and extension schemas may be stored in a database using a hierarchical data model, such as using a JavaScript Object Notation (JSON) structure. Thus, if developers are creating a new entity service to store data about a new entity (e.g., if a customer relationship management platform adds "organization" entities in addition to "contact" entities), the developer can access extension schemas for all relevant extension services of an application from the common metadata repository. Thus, the newly added entity is smoothly integrated to operate with the existing extension services. Further, a developer could create a new extension service that is based on existing entity services (e.g., a search service that operates across entities). For example, a developer could submit a request to the metadata repository to access schemas for all other entities and services used by a software platform (e.g., using a Structured Query Language (SQL) or non-SQL query language). In response, the metadata repository would retrieve all stored entity schemas and all stored extension schemas and provide them to the developer. Thus, embodiments of the present disclosure reduce onboarding and development time, and help ensure smooth interoperability between the different services and entities that are utilized by an application platform.

Furthermore, as described in more detail below, the scalable common metadata repository model effectively captures both dependencies and inter-relationships between different entities of the model (e.g., via separation of entity services and extension services). Embodiments of the disclosure provide a way to model both structure and interactions (e.g., where such relationships and interaction surfaces of the entities can be visualized simply by study at the entity structure). Further, the single-source-of-truth that the system provides (via implementation of the singular metadata repository) increases the scalability of the whole enterprise application (e.g., without imposing additional system costs). Enterprise applications/entities may store/fetch configurations from multiple services/libraries, visualize enterprise wide object inter-dependencies, and onboard existing services for new nouns more efficiently, etc.

As used herein, the term "application" refers to a software, hardware, or other computer service that performs a function for users. In some examples, an application may include a web interface, and the users may interact with the web interface to perform the functions of the application.

The term "entity service" refers to a database service that stores entities of a particular type for use by an application. These entities can be stored using a data structure referred to as an "entity schema." For example, a customer relationship management application may interact with an entity service that stores "contacts," "leads," or "opportunities." In some embodiments, the entity service stores the entities according to an entity schema that includes a format that indicates what properties may be stored for each entity.

The term "extension service" refers to an automated service that provides one or more functional aspects of an application. Patterns for interacting with the service can be stored using a data structure referred to as an "extension schema." For example, an extension service can provide search or UI generation capabilities for an application. In some cases, extensions services interact with data provided from entity services. For example, a search service may enable users to search entities stored by an entity service. An extension service may operate using an extension schema that indicates what fields are sent to and from the extension service.

The term "metadata repository" refers to an automated service for providing access to the schemas used by entity services and extension services. This enables these services to be generated more easily and to interact more efficiently.

FIG. 1 shows an example of a data management system according to aspects of the present disclosure. The example shown includes user 100, device 105, web server 110, metadata repository 115, entity services 120, and extension services 125.

Systems and techniques of the present disclosure describe a scalable common metadata repository 115 model including single-source-of-truth metadata repository 115 (e.g., across all entities), as well as separated entity services 120 and extension services 125.

Distributed software systems may include decoupled components that interact by remote procedure calls. A broker pattern may include or refer to an architectural pattern used for structuring of such distributed software systems. A broker component may be responsible for coordinating communication (e.g., coordinating request forwarding), as well as for transmitting exceptions and results.

As described herein, aspects of a broker pattern may be implemented by applications (e.g., applied to enterprise microservices) to unify and integrate effortlessly. In some cases, aspects of broker patterns for messaging may be applied in enterprise world where entities are spread across domains. Such a broker pattern may ensure cross domain entities are onboard to unified microservices (e.g., in little to no time, by merely writing a configuration). In some examples, such systems may help new products and 3rd parties to integrate with cloud services quickly (e.g., by publishing onboarding configurations and data to a pipeline).

Device 105 may include or refer to a computing device, such as a personal computer, laptop computer, mainframe computer, palmtop computer, personal assistant, mobile device, or any other suitable processing apparatus.

In some cases, user 100 may interact with a data management system (e.g., and applications) via a web server 110. A server provides one or more functions to users 100 linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

In some cases, device 105 and/or web server 110 may include or interface with a display. A display may comprise a conventional monitor, a monitor coupled with an integrated display, an integrated display (e.g., an LCD display), or other means for viewing associated data or processing information. Output devices other than the display can be used, such as printers, other computers or data storage devices, and computer networks.

In some examples, device 105 may interface with web server 110 via a cloud. A cloud is a computer network configured to provide on-demand availability of computer system resources, such as data storage and computing power. In some examples, the cloud provides resources without active management by the user 100. The term cloud is sometimes used to describe data centers available to many users 100 over the Internet. Some large cloud networks have functions distributed over multiple locations from central servers. A server is designated an edge server if it has a direct or close connection to a user 100. In some cases, a cloud is limited to a single organization. In other examples, the cloud is available to many organizations. In one example, a cloud includes a multi-layer communications network comprising multiple edge routers and core routers. In another example, a cloud is based on a local collection of switches in a single physical location.

According to some aspects, web server 110 receives an entity search request from a user 100 of an application (e.g., where an extension service 125 includes a search service). In some examples, web server 110 displays search results corresponding to the entity data.

According to some aspects, metadata repository 115 receives from an additional entity service 120, an extension schema request indicating an extension schema corresponding to an extension service 125 of the set of extension services 125. In some examples, metadata repository 115 provides, from the metadata repository 115 to the additional entity service, the extension schema in response to the extension schema request. In some examples, metadata repository 115 stores the additional entity schema (e.g., in the metadata repository 115). In some aspects, the metadata repository 115 includes multiple entity schemas for at least one of the set of entity services 120. Metadata repository 115 is an example of, or includes aspects of, the corresponding element described with reference to FIGS. 2 and 5.

According to some aspects, an entity service 120 generates an additional entity schema based on the extension schema. In some aspects, the entity service 120 includes a database for storing entities according to the entity schema. Entity services 120 are examples of, or include aspects of, the corresponding element(s) described with reference to FIG. 2.

According to some aspects, an extension service 125 generates an entity request for the entity service based on the entity schema. In some examples, the extension service 125 transmits, to the entity service 120, the entity request. In some examples, an extension service 125 receives, from the entity service 120, entity data in response to the entity request. In some examples, an extension service 125 generates user interface (UI) components for the application based on the entity schema, where the extension service includes a UI service. Extension services 125 are examples of, or include aspects of, the corresponding element(s) described with reference to FIG. 2.

Figure 2:
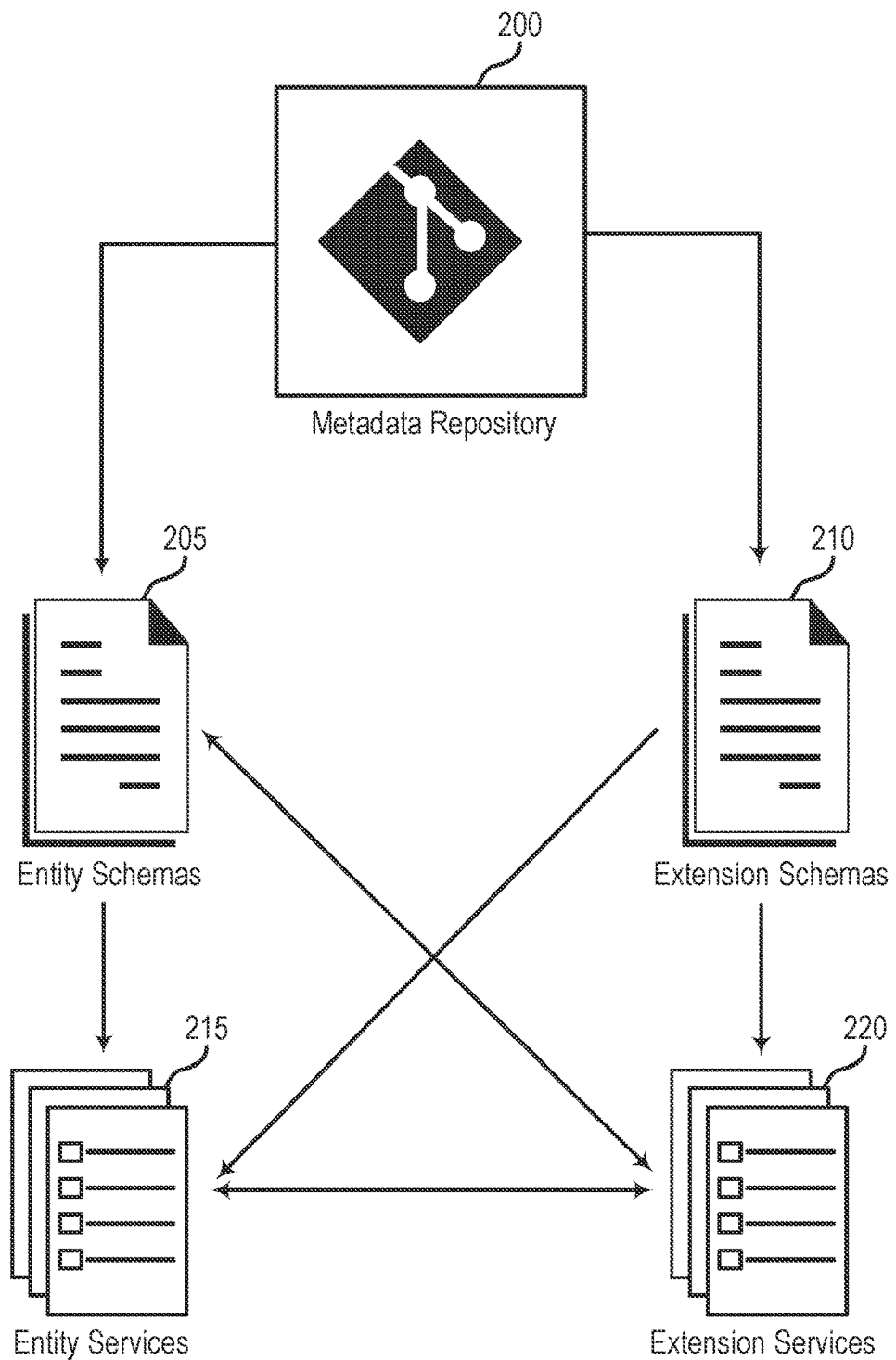
FIG. 2 shows an example of a metadata repository according to aspects of the present disclosure.

FIG. 2 shows a metadata repository according to aspects of the present disclosure. The example shown includes metadata repository 200, entity schemas 205, extension schemas 210, entity services 215, and extension services 220. Metadata repository 200 is an example of, or includes aspects of, the corresponding element described with reference to FIGS. 1 and 5. Entity services 215 is an example of, or includes aspects of, the corresponding element described with reference to FIG. 1. Extension services 220 is an example of, or includes aspects of, the corresponding element described with reference to FIG. 1.

Schema matching refers to the process of determining whether two objects are semantically related. In some cases, schema matching is used to organize data for entry into a database. For example, a schema matching system may determine that an object (e.g., a piece of data, such as the name "John") corresponds to a particular field in a database schema (e.g., the field labeled "First Name").

Systems and techniques of the present disclosure describe a scalable common metadata repository 200 model including single-source-of-truth repository across all entities. Further, the scalable common metadata repository 200 model may effectively capture both dependencies and inter-relationships between different entities of the model (e.g., via separation of entity services 215 and extension services 220).

In other words, aspects of the systems and techniques described herein may include a singular metadata repository 200, as well as separated entity services 215 and extension services 220. Such may provide a way to model both structure and interactions (e.g., where such relationships and interaction surfaces of the entities can be visualized simply by study at the entity structure). Further, the single-source-of-truth that the system provides (via implementation of the singular metadata repository 200) may increase the scalability of the whole enterprise application (e.g., without imposing additional system costs). Enterprise applications/entities may not have to store/fetch configurations from multiple services/libraries, may visualize enterprise wide object interdependencies, onboard existing services for new nouns more efficiently, etc.

Accordingly, the present disclosure may provide applications with seamless onboarding of entities to fasten development. Moreover, the relationships/interaction surfaces of the onboarding/existing entity may be visualized simply by looking at the entity structure. Systems may be configuration driven and require less code. Version control management may ensure backward compatibility (e.g., if any major changes happen with the entity definition or the microservice specifications). Reusability of such systems may also be increased (e.g., as multiple capabilities can use the same config data of an entity, such as if a search user interface (UI) wants to read UI metadata fields of an entity like name, URL, icon, etc. for an entity).

In some cases, metadata (e.g., entity schemas 205, extension schemas 210, etc.) may be stored in a single location (e.g., in a code repository, such as Git, or in a database). Each entity schemas 205/extension schemas 210 may have its own definition (e.g., such as Extensible Markup Language (XML) schema definition (XSD) or JavaScript Object Notation (JSON)-schema template), as well as a conforming implementation. In some cases, both the entity schemas 205/extension schemas 210 definition and the entity schemas 205/extension schemas 210 implementation may evolve across application versions. In some aspects, the set of entity schemas 205 and the set of extension schemas 210 are formatted according to a JSON format. Downstream microservices (e.g., entity services 215, extension services 220, etc.) may build entity schemas 205/extension schema definition and entity schemas 205/extension schemas 210 implementation in a backward-compatible fashion (e.g., in order to not break inter-dependent services across releases of different application versions).

The single metadata repository 200 described herein provides a single, central view of the whole enterprise application. Studying the various definitions can provide many benefits, such as simpler implementation of new services (e.g., since the definition of dependent entities and extensions is well known, what exactly are the supportable/unsupportable features can be precisely determined). Moreover, new extension services 220 that provide common functionalities across all entities can be envisioned, duplicate extension services 220 can be pruned, etc.

Entity services 215 provide specific capabilities concerning the entity. For example, for a CRM system, each of the contacts, leads, opportunities, customers, cases, etc. may include a set of features (starting with create, read, update, and delete (CRUD) operations). In such an example, in some aspects, the 'contacts' microservice may be in Java, while the 'customers' microservice may be in Rust (e.g., given the heterogenous tech-stacks used in modern day enterprise architectures).

Extension services 220 provide auxiliary capabilities across n entities. In some cases, a successful enterprise application may 'search' across all its entities. Even the UI of the application may be thought of as an auxiliary capability (e.g., if the UI has a grid view for each entity and the UI rendering for all entities is the concern of yet another microservice). By this model, the 'search' and 'UI' are extension services 220 that act across n entities. The 'search' and 'UI' extension services 220 may provide a set of features/capabilities and may be dependent on data/configuration aligning to a specific schema (e.g., as such, 'search' and 'UI' may have their own schemas stored in the metadata repository 200).

Once the entities are onboarded with their respective data, microservices (e.g., the microservices the entities are onboarded to) sync with this metadata may store service to prefetch the content at regular intervals since it's the metadata store service, it populates an in memory cache with the available data of an entity so as to provide response related to onboarded data (e.g., in a few milliseconds, whenever requested).

Figure 3:
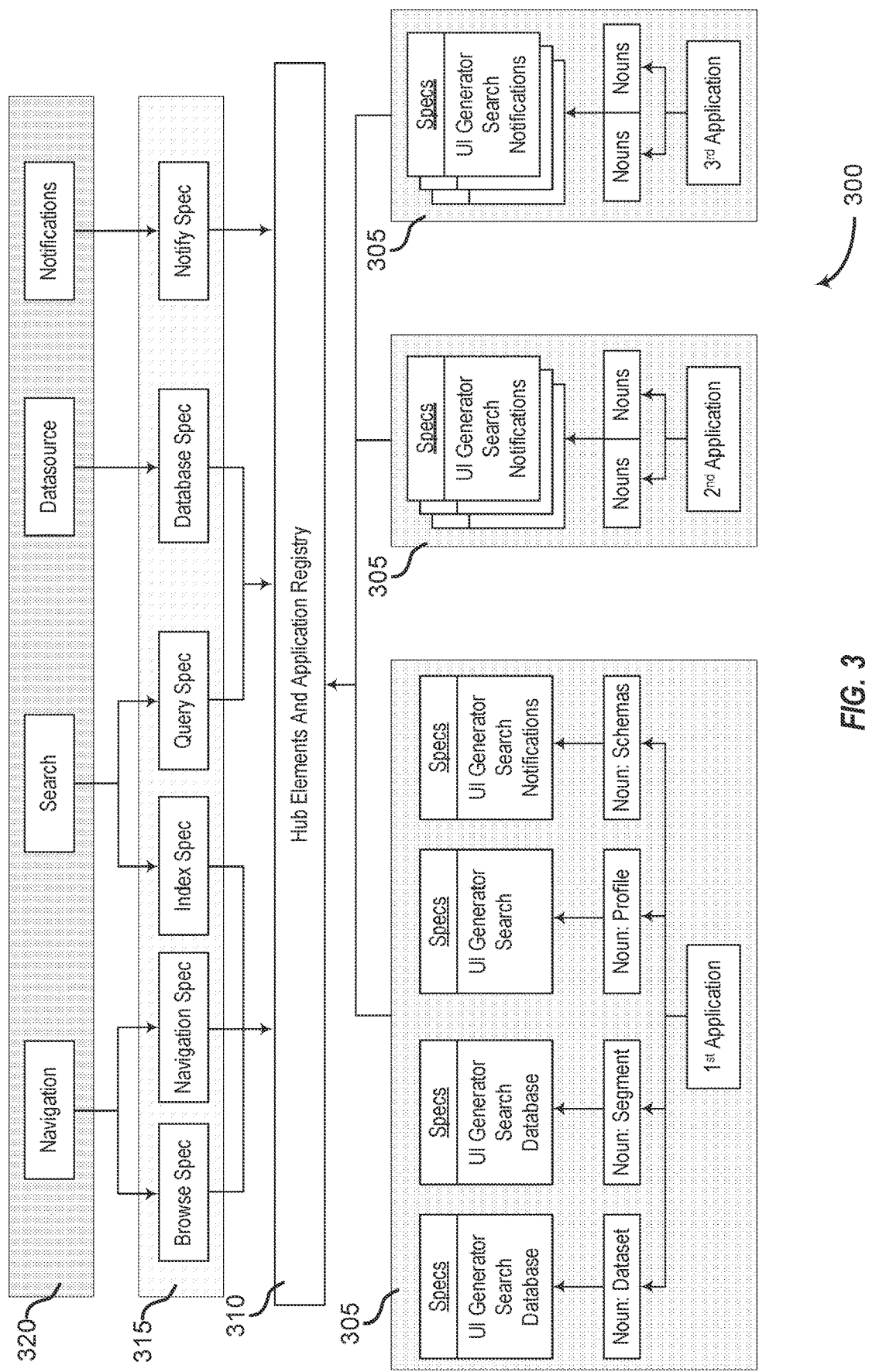
FIG. 3 shows a diagram of interactions with a metadata repository according to aspects of the present disclosure.

FIG. 3 shows a diagram of interactions with a metadata repository according to aspects of the present disclosure. Data management architecture 300 is an example of, or includes aspects of, the corresponding element described with reference to FIG. 4. In one aspect, data management architecture 300 includes applications 305, object map service 310, component specifications 315, and hub components 320. Applications 305 are examples of, or include aspects of, the corresponding elements described with reference to FIG. 4. Object map service 310 are examples of, or include aspects of, the corresponding elements described with reference to FIG. 4. Hub components 320 are examples of, or include aspects of, the corresponding elements described with reference to FIG. 4.

An apparatus, non-transitory computer readable medium, and system for enterprise applications supported by common metadata repository is described. One or more aspects of the apparatus, non-transitory computer readable medium, and system include storing a plurality of entity schemas in a metadata repository, wherein each of the plurality of entity schemas corresponds to a different entity service from a plurality of entity services that interact with an application, and storing a plurality of extension schemas in the metadata repository, wherein each of the plurality of extension schemas corresponds to a different extension service from a plurality of extension services utilized by the application. One or more aspects of the apparatus, non-transitory computer readable medium, and system further include receiving, at the metadata repository from an extension service of the plurality of extension services, an entity schema request indicating an entity schema corresponding to an entity service of the plurality of entity services (or receiving an extension schema request from an entity service), and providing, from the metadata repository to the extension service, the entity schema in response to the entity schema request (or providing the extension schema to the extension service).

Some examples of the apparatus, non-transitory computer readable medium, and system further include generating, by the extension service, an entity request for the entity service based on the entity schema. Some examples further include transmitting, by the extension service to the entity service, the entity request. Some examples further include receiving, at the extension service from the entity service, entity data in response to the entity request.

Some examples of the apparatus, non-transitory computer readable medium, and system further include receiving an entity search request from a user of the application, wherein the extension service comprises a search service. Some examples further include displaying search results corresponding to the entity data. Some examples of the apparatus, non-transitory computer readable medium, and system further include generating, by the extension service, UI components for the application based on the entity schema, wherein the extension service comprises a UI service.

Some examples of the apparatus, non-transitory computer readable medium, and system further include receiving, at the metadata repository from an additional entity service, an extension schema request indicating an extension schema corresponding to an extension service of the plurality of extension services. Some examples further include providing, from the metadata repository to the additional entity service, the extension schema in response to the extension schema request. Some examples of the apparatus, non-transitory computer readable medium, and system further include generating an additional entity schema based at least in part on the extension schema. Some examples further include storing the additional entity schema in the metadata repository.

In some aspects, the entity service comprises a database for storing entities according to the entity schema. In some aspects, the metadata repository includes multiple entity schemas for at least one of the plurality of entity services. In some aspects, the plurality of entity schemas and the plurality of extension schemas are formatted according to a JSON format.

Figure 4:
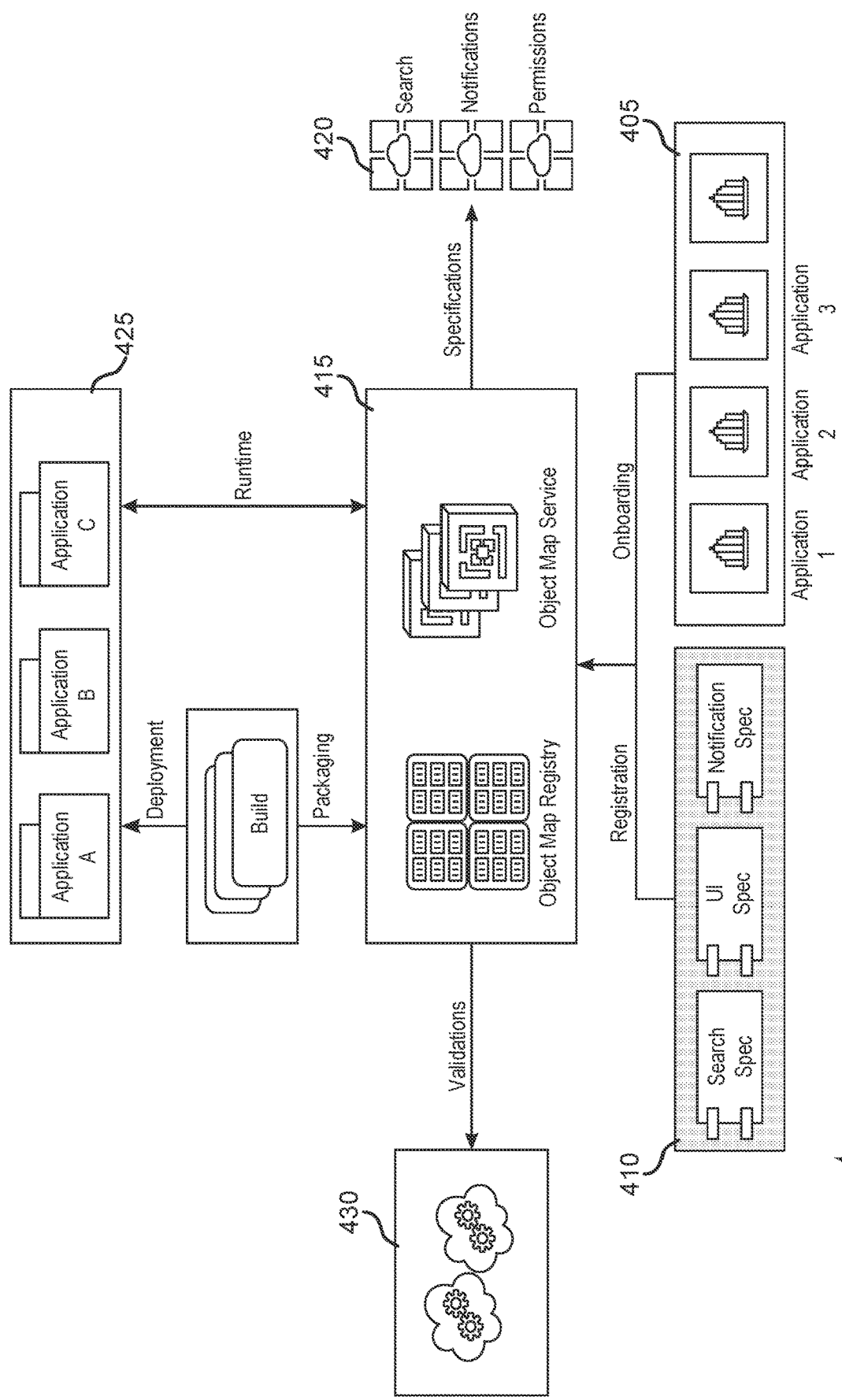
FIG. 4 shows an example of a multi-application system according to aspects of the present disclosure.

FIG. 4 shows an example of a multi-application system according to aspects of the present disclosure. Data management architecture 400 is an example of, or includes aspects of, the corresponding element described with reference to FIG. 3. In one aspect, data management architecture 400 includes applications 405, hub components 410, object map service 415, specifications 420, user interface 425, and database 430. Applications 405 are examples of, or include aspects of, the corresponding elements described with reference to FIG. 3. Hub components 410 are examples of, or include aspects of, the corresponding elements described with reference to FIG. 3. Object map service 415 are examples of, or include aspects of, the corresponding elements described with reference to FIG. 3.

Object-relational mapping (e.g., aspects of object map service 415) may generally include converting data between incompatible type systems using object-oriented programming languages. For instance, an object map registry may include virtual object database that can be used from within a programming language. An object map service may include a service performed using the object map registry. In some aspects, a single-page application (SPA) pipeline may exist between object map service 415 and user interface 425.

A database 430 is an organized collection of data. For example, a database 430 stores data in a specified format known as a schema. A database 430 may be structured as a single database 430, a distributed database 430, multiple distributed databases 430, or an emergency backup database 430. In some cases, a database 430 controller may manage data storage and processing in a database 430. In some cases, a user interacts with database 430 controller. In other cases, database 430 controller may operate automatically without user interaction. In some cases, database 430 may include an open-source data query and manipulation language for APIs (e.g., and a runtime for satisfying queries with available data).

A user interface 425 may enable a user to interact with a device. In some embodiments, the user interface 425 may include an audio device, such as an external speaker system, an external display device such as a display screen, or an input device (e.g., remote control device interfaced with the user interface 425 directly or through an IO controller module). In some cases, a user interface 425 may be a graphical user interface 425 (GUI).

In some examples, applications 405 may include one or more applications such as customer data applications, marketing applications, etc. Marketing refers to activities taken by companies and individuals to encourage potential customers to purchase products or services. Marketing activities may take a variety of different forms, which may be referred to as marketing channels. A person or company may employ a variety of different marketing channels such as email, television, display, and social media to encourage sales.

Figure 5:
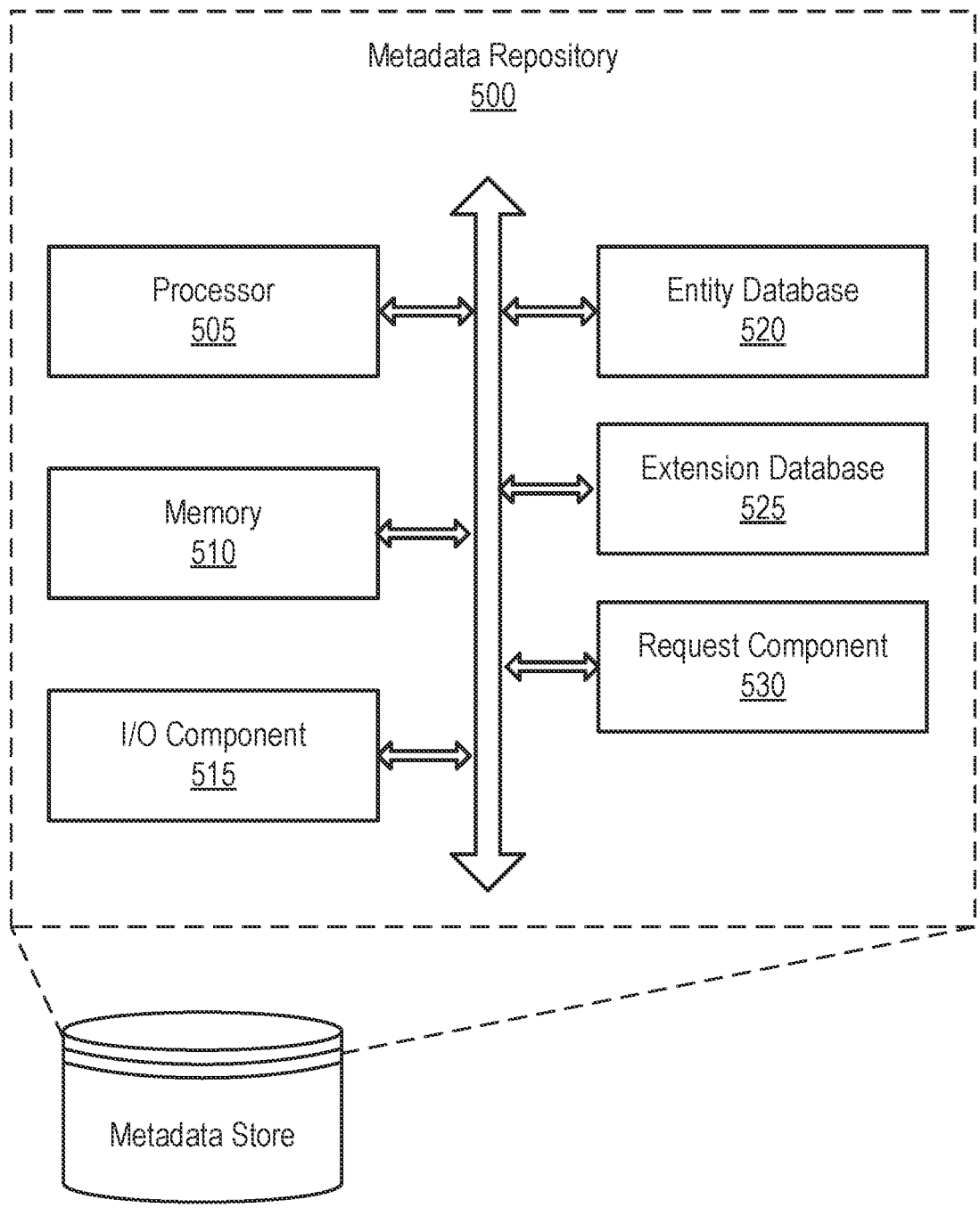
FIG. 5 shows an example of a metadata repository according to aspects of the present disclosure.

FIG. 5 shows an example of a metadata repository 500 according to aspects of the present disclosure. Metadata repository 500 is an example of, or includes aspects of, the corresponding element described with reference to FIGS. 1 and 2. In one aspect, metadata repository 500 includes processor 505, memory 510, I/O component 515, entity database 520, extension database 525, and request component 530.

According to some aspects, entity database 520 stores a set of entity schemas in a metadata repository 500, where each of the set of entity schemas corresponds to a different entity service from a set of entity services that interact with an application. According to some aspects, extension database 525 stores a set of extension schemas in the metadata repository 500, where each of the set of entity schemas corresponds to a different extension service from a set of extension services utilized by the application.

According to some aspects, request component 530 receives, at the metadata repository 500 from an extension service of the set of extension services, an entity schema request indicating an entity schema corresponding to an entity service of the set of entity services. In some examples, request component 530 provides, from the metadata repository 500 to the extension service, the entity schema in response to the entity schema request.

A processor 505 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor 505 may be configured to operate a memory array using a memory 510 controller. In other cases, a memory controller is integrated into the processor 505. In some cases, the processor 505 is configured to execute computer-readable instructions stored in a memory 510 to perform various functions. In some embodiments, a processor 505 includes special purpose components for modem processing, baseband processing, digital signal processing, or transmission processing.

Examples of a memory 510 device include random access memory (RAM), read-only memory (ROM), or a hard disk. Examples of memory 510 devices include solid state memory 510 and a hard disk drive. In some examples, memory 510 is used to store computer-readable, computer-executable software including instructions that, when executed, cause a processor 505 to perform various functions described herein. In some cases, the memory 510 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory 510 store information in the form of a logical state.

In some cases, one or more aspects of the present disclosure may be implemented in whole or in part via software. Software may include code to implement aspects of the present disclosure. Software may be stored in a non-transitory computer-readable medium such as system memory or other memory. In some cases, the software may not be directly executable by the processor but may cause a computer (e.g., when compiled and executed) to perform functions described herein.

An input/output (I/O) controller (e.g., I/O component 515) may manage input and output signals for a device. I/O component 515 may also manage peripherals not integrated into a device. In some cases, I/O component 515 may represent a physical connection or port to an external peripheral. In some cases, an IO controller may utilize an operating system such as iOS®, ANDROID®, MS-DOS®, MS-WINDOWS®, OS/2®, UNIX®, LINUX®, or another known operating system. In other cases, I/O component 515 may represent or interact with a modem, a keyboard, a mouse, a touchscreen, or a similar device. In some cases, an IO controller may be implemented as part of a processor 505. In some cases, a user may interact with a device via I/O component 515 or via hardware components controlled by I/O component 515.

Figure 6:
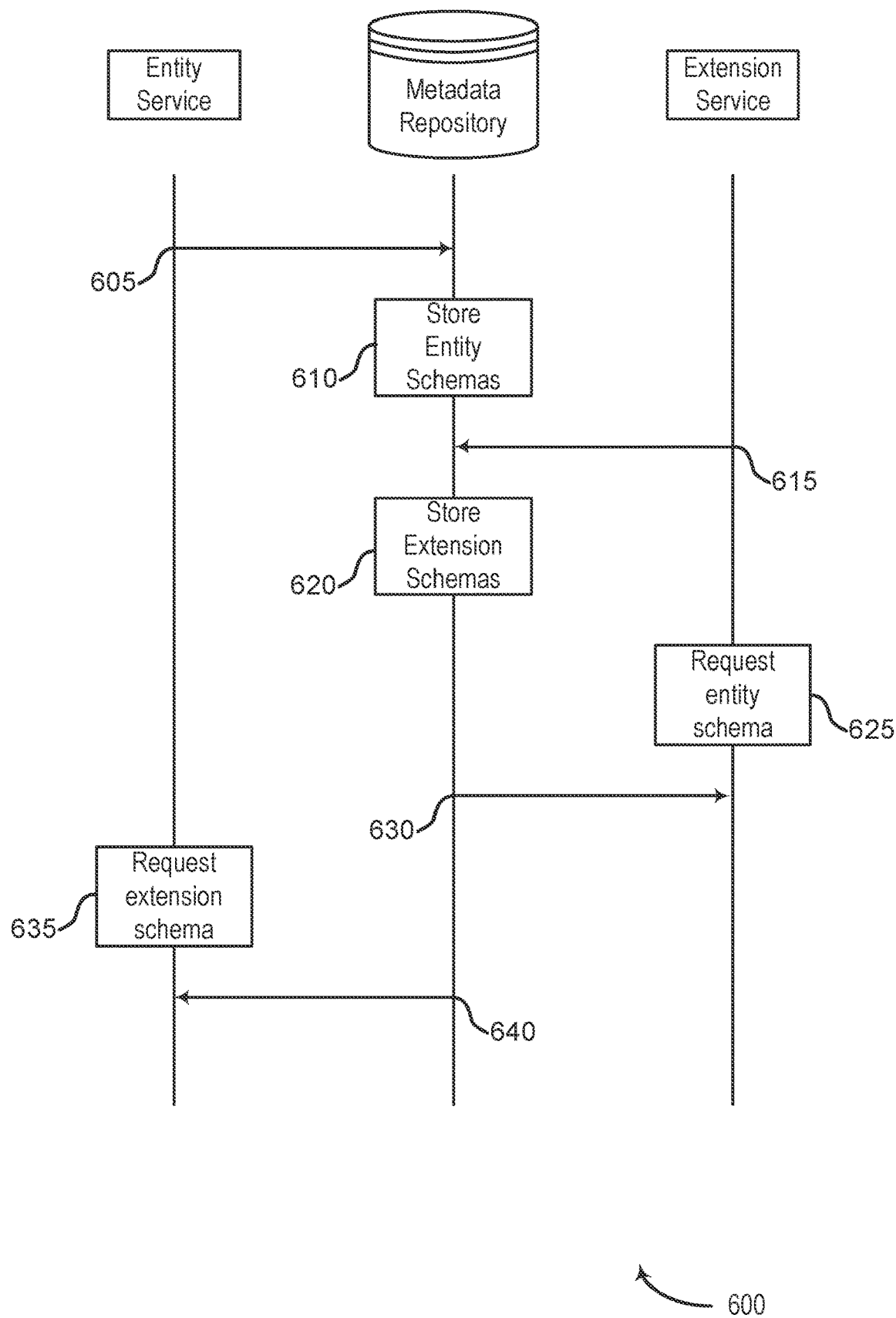
FIG. 6 shows an example of a data management process according to aspects of the present disclosure.

FIG. 6 shows an example of a data management process 600 according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 605, an entity service provides one or more entity schemas to a metadata repository. In some cases, the operations of this step refer to, or may be performed by, an entity services as described with reference to FIGS. 1 and 2.

At operation 610, the metadata repository stores the one or more entity schemas. In some cases, the operations of this step refer to, or may be performed by, a metadata repository as described with reference to FIGS. 1, 2, and 5.

At operation 615, an extension service provides one or more extension schemas. In some cases, the operations of this step refer to, or may be performed by, an extension services as described with reference to FIGS. 1 and 2.

At operation 620, the metadata repository stores the one or more extension schemas. In some cases, the operations of this step refer to, or may be performed by, a metadata repository as described with reference to FIGS. 1, 2, and 5.

At operation 625, the extension service requests an entity schema. In some cases, the operations of this step refer to, or may be performed by, an extension services as described with reference to FIGS. 1 and 2. Alternatively, an entity service can request an extension schema, an extension service can request an extension schema, or an entity service can request an entity schema.

At operation 630, the metadata repository provides the extension service with requested entity schema. In some cases, the operations of this step refer to, or may be performed by, a metadata repository as described with reference to FIGS. 1, 2, and 5.

At operation 635, the entity service requests an extension schema. In some cases, the operations of this step refer to, or may be performed by, an entity services as described with reference to FIGS. 1 and 2.

At operation 640, the metadata repository provides entity service with requested extension schema. In some cases, the operations of this step refer to, or may be performed by, a metadata repository as described with reference to FIGS. 1, 2, and 5.

Figure 7:
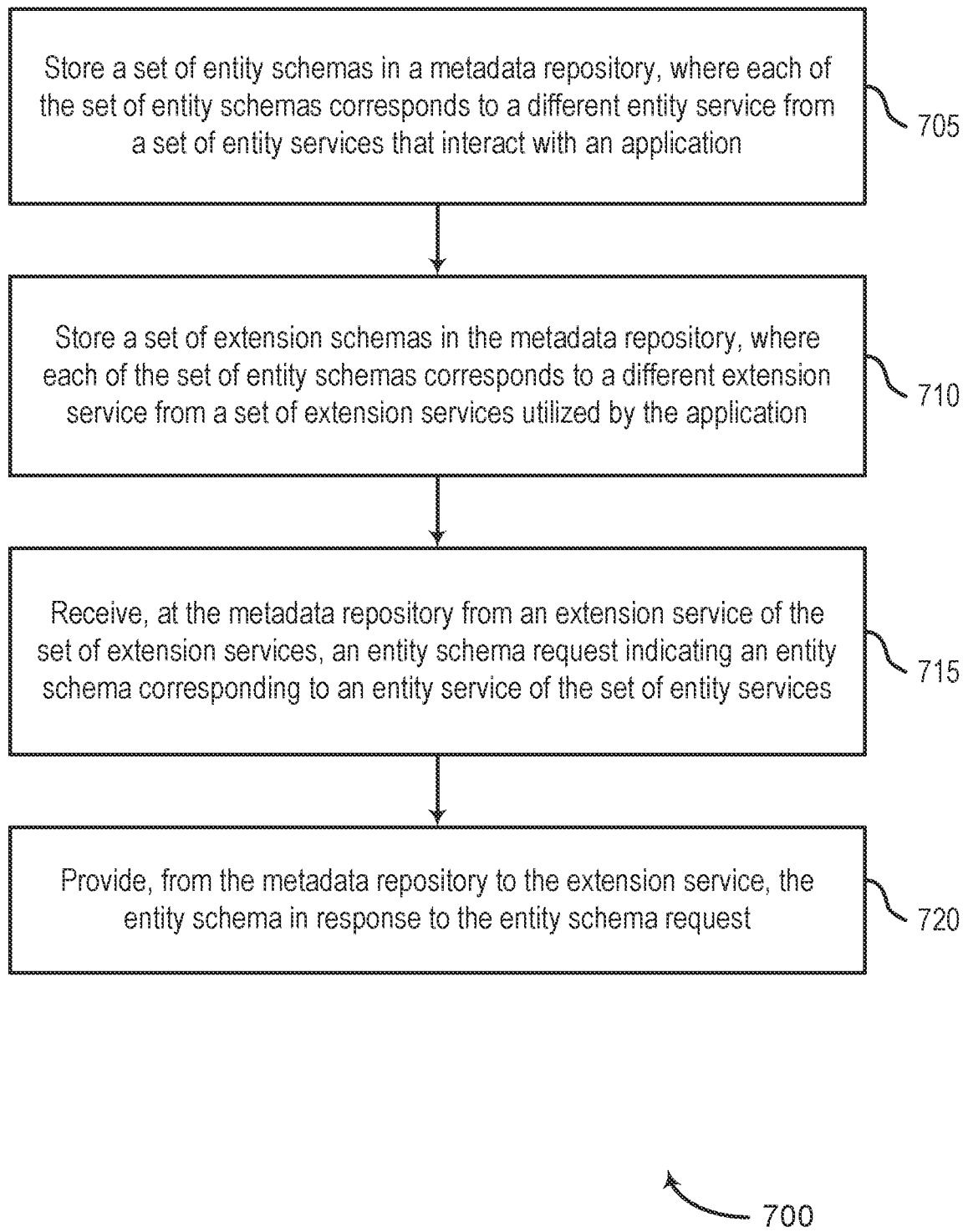
FIG. 7 shows an example of a process for data management according to aspects of the present disclosure.

FIG. 7 shows an example method 700 for data management according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 705, the metadata repository stores a set of entity schemas in a metadata repository, where each of the set of entity schemas corresponds to a different entity service from a set of entity services that interact with an application. In some cases, the operations of this step refer to, or may be performed by, an entity database as described with reference to FIG. 5.

At operation 710, the metadata repository stores a set of extension schemas in the metadata repository, where each of the set of entity schemas corresponds to a different extension service from a set of extension services utilized by the application. In some cases, the operations of this step refer to, or may be performed by, an extension database as described with reference to FIG. 5.

At operation 715, the metadata repository receives, from an extension service of the set of extension services, an entity schema request indicating an entity schema corresponding to an entity service of the set of entity services. In some cases, the operations of this step refer to, or may be performed by, a request component as described with reference to FIG. 5.

At operation 720, the metadata repository provides, to the extension service, the entity schema in response to the entity schema request. In some cases, the operations of this step refer to, or may be performed by, a request component as described with reference to FIG. 5.

Some examples of the method 700 further include generating, by the extension service, an entity request for the entity service based on the entity schema. Some examples further include transmitting, by the extension service to the entity service, the entity request. Some examples further include receiving, at the extension service from the entity service, entity data in response to the entity request.

Some examples of the method 700 further include receiving an entity search request from a user of the application, wherein the extension service comprises a search service. Some examples further include displaying search results corresponding to the entity data. Some examples of the method 700 further include generating, by the extension service, user interface (UI) components for the application based on the entity schema, wherein the extension service comprises a UI service.

Some examples of the method 700 further include receiving, at the metadata repository from an additional entity service, an extension schema request indicating an extension schema corresponding to an extension service of the plurality of extension services. Some examples further include providing, from the metadata repository to the additional entity service, the extension schema in response to the extension schema request. Some examples of the method 700 further include generating an additional entity schema based at least in part on the extension schema. Some examples further include storing the additional entity schema in the metadata repository.

In some aspects, the entity service comprises a database for storing entities according to the entity schema. In some aspects, the metadata repository includes multiple entity schemas for at least one of the plurality of entity services. In some aspects, the plurality of entity schemas and the plurality of extension schemas are formatted according to a JSON format.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described systems and methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for data management, comprising:
receiving, by an entity database of a metadata repository, a plurality of entity schemas, wherein each of the plurality of entity schemas is received from a different entity service from a plurality of entity services that store data for entities used by an application, wherein the metadata repository includes a single source-of-truth repository across the plurality of entity services and across a plurality of extension services that perform functional aspects of the application other than storing data;
receiving, by an extension database of the metadata repository, a plurality of extension schemas, wherein each of the plurality of extension schemas is received from a different extension service from the plurality of extension services utilized by the application, wherein the extension database is separate from the entity database;
receiving, by a request component of the metadata repository from an extension service of the plurality of extension services, an entity schema request indicating an entity schema corresponding to an entity service of the plurality of entity services;
providing, by the request component of the metadata repository to the extension service, the entity schema in response to the entity schema request;
receiving, by the request component of the metadata repository from the entity service, an extension schema request indicating an extension schema corresponding to the extension service; and
providing, by the request component of the metadata repository to the entity service, the extension schema in response to the extension schema request.

2. The method of claim 1, further comprising:
generating, by the extension service, an entity request for the entity service based on the entity schema;
transmitting, by the extension service to the entity service, the entity request; and
receiving, at the extension service from the entity service, entity data in response to the entity request.

3. The method of claim 2, further comprising:
receiving, by the request component, an entity search request from a user of the application, wherein the extension service comprises a search service; and
displaying search results corresponding to the entity data.

4. The method of claim 1, further comprising:
generating, by the extension service, user interface (UI) components for the application based on the entity schema, wherein the extension service comprises a UI service.

5. The method of claim 1, further comprising:
receiving, by the request component from an additional entity service, an additional extension schema request indicating an additional extension schema corresponding to an additional extension service of the plurality of extension services; and
providing, by a request component to the additional entity service, the additional extension schema in response to the additional extension schema request.

6. The method of claim 5, further comprising:
generating an additional entity schema based at least in part on the extension schema; and
storing the additional entity schema in the metadata repository.

7. The method of claim 1, wherein:
the entity service comprises a database for storing entities according to the entity schema.

8. The method of claim 1, wherein:
the metadata repository includes multiple entity schemas for at least one of the plurality of entity services.

9. The method of claim 1, wherein:
the plurality of entity schemas and the plurality of extension schemas are formatted according to a JSON format.

10. An apparatus for data management, comprising: a processor and a memory storing instructions and in electronic communication with the processor, the processor being configured to execute the instructions to:
receive, by an entity database of a metadata repository, a plurality of entity schemas, wherein each of the plurality of entity schemas is received from a different entity service from a plurality of entity services that store data for entities used by an application, wherein the metadata repository includes a single source-of-truth repository across the plurality of entity services and across a plurality of extension services that perform functional aspects of the application other than storing data;

receive, by an extension database of the metadata repository, a plurality of extension schemas, wherein each of the plurality of extension schemas is received from a different extension service from the plurality of extension services utilized by the application, wherein the extension database is separate from the entity database;

receive, by a request component of the metadata repository from an entity service of the plurality of entity services, an extension schema request indicating an extension schema corresponding to an extension service of the plurality of extension services;

provide, from the request component of the metadata repository to the entity service, the extension schema in response to the extension schema request;

receive, by the request component of the metadata repository from the entity service, an extension schema request indicating an extension schema corresponding to the extension service; and provide, by the request component of the metadata repository to the entity service, the extension schema in response to the extension schema request.

11. The apparatus of claim 10, the processor being further configured to execute the instructions to:

receive, by the request component of the metadata repository from the extension service, an entity schema request indicating an entity schema corresponding to the entity service; and provide, by the request component of the metadata repository to the extension service, the entity schema in response to the entity schema request.

12. The apparatus of claim 11, the processor being further configured to execute the instructions to:

provide, by the request component of the metadata repository to the extension service, entity schemas corresponding to each of the plurality of entity services in response to the entity schema request.

13. The apparatus of claim 11, the processor being further configured to execute the instructions to:

generate, by the extension service, an entity request for the entity service based on the entity schema;

transmit, by the extension service to the entity service, the entity request; and receive, at the extension service from the entity service, entity data in response to the entity request.

14. The apparatus of claim 10, the processor being further configured to execute the instructions to:

generate, by the extension service, user interface (UI) components for the application based on the entity schema, wherein the extension service comprises a UI service.

15. The apparatus of claim 10, wherein:

the plurality of entity schemas and the plurality of extension schemas are formatted according to a JSON format.

16. The apparatus of claim 10, the processor being further configured to execute the instructions to:

provide, from the request component of the metadata repository to the entity service, extension schemas corresponding to each of the plurality of extension schemas in response to the extension schema request.

* * * * *